(12) United States Patent
Yang et al.

(10) Patent No.: US 10,817,187 B2
(45) Date of Patent: Oct. 27, 2020

(54) BALANCING THE BLOCK WEARING LEVELING FOR OPTIMUM SSD ENDURANCE

(71) Applicant: WESTERN DIGITAL TECHNOLOGIES, INC., San Jose, CA (US)

(72) Inventors: Niles Yang, Mountain View, CA (US); Sahil Sharma, San Jose, CA (US); Rohit Sehgal, San Jose, CA (US); Phil Reusswig, Mountain View, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/256,020

(22) Filed: Jan. 24, 2019

(65) Prior Publication Data

US 2020/0241765 A1    Jul. 30, 2020

(51) Int. Cl.
    *G06F 3/06*    (2006.01)
(52) U.S. Cl.
    CPC .......... *G06F 3/0616* (2013.01); *G06F 3/064* (2013.01); *G06F 3/0659* (2013.01); *G06F 3/0679* (2013.01)
(58) Field of Classification Search
    CPC ...... G06F 3/0616; G06F 3/064; G06F 3/0659; G06F 3/0679
    See application file for complete search history.

(56) References Cited

U.S. PATENT DOCUMENTS 8,103,821 B2 *  1/2012  Chang ................. G06F 12/0246
                                                  711/103
8,144,505 B2 *  3/2012  Lee ..................... G11C 11/5621
                                                  365/148

(Continued)

FOREIGN PATENT DOCUMENTS

CN          108255419         7/2018

OTHER PUBLICATIONS

Anna Marie Helmenstine, "Conversion Factor Definition and Examples: What a Conversion Factor Is and How to Use It", Oct. 14, 2017, pp. 1-8, https://web.archive.org/web/20171014045643/https://www.thoughtco.com/definition-of-conversion-factor-604954 (Year: 2017).*

(Continued)

*Primary Examiner* — Christopher D Birkhimer
(74) *Attorney, Agent, or Firm* — Morgan, Lewis & Bockius LLP (57) ABSTRACT

In one embodiment, there is a method for implementing balancing block wearing leveling at a storage device including one or more single level cell (SLC) blocks in a SLC block pool and one or more non-single level cell (nSLC) blocks in a nSLC block pool for storing data and a memory controller for performing operations on the SLC blocks and nSLC blocks, the method comprising: at the memory controller: receiving a first request to perform a wear leveling operation on a respective block pool of one of: the SLC block pool and the nSLC block pool; determining whether one or more blocks in the respective block pool meet block pool transfer criteria; in response to a determination that the one or more blocks in the respective block pool meets block pool transfer criteria, reclassifying the one or more blocks in the respective block pool as the other of the SLC block pool and the nSLC block pool; and in response to a determination that the one or more blocks in the respective block pool does not meet block pool transfer criteria, refraining from reclas- (Continued)

sifying the one or more blocks in the respective block pool as the other of the SLC block pool and the nSLC block pool.

14 Claims, 5 Drawing Sheets

(56) References Cited

U.S. PATENT DOCUMENTS

| | | | |
|---|---|---|---|
| 8,335,887 B2 * | 12/2012 | Kim | G06F 12/0246 |
| | | | 711/103 |
| 8,767,461 B2 | 7/2014 | Kim | |
| 8,804,415 B2 * | 8/2014 | Wood | G11C 16/20 |
| | | | 365/184 |
| 9,021,177 B2 * | 4/2015 | Segal | G06F 12/0246 |
| | | | 711/103 |
| 9,588,883 B2 * | 3/2017 | Kim | G06F 3/0679 |
| 9,697,134 B2 * | 7/2017 | Hale | G06F 3/0634 |
| 9,864,697 B2 * | 1/2018 | Hale | G06F 12/0238 |
| 9,965,199 B2 | 5/2018 | Reddy et al. | |
| 9,996,274 B2 * | 6/2018 | Kim | G06F 3/0679 |
| 9,997,240 B2 | 6/2018 | Rao | |
| 10,083,119 B2 * | 9/2018 | Hale | G06F 3/0673 |
| 2010/0008140 A1 * | 1/2010 | Lee | G11C 16/349 |
| | | | 365/185.03 |
| 2013/0080730 A1 * | 3/2013 | Kim | G06F 3/0679 |
| | | | 711/203 |
| 2013/0336072 A1 * | 12/2013 | Wood | G11C 11/5628 |
| | | | 365/185.24 |
| 2016/0364337 A1 * | 12/2016 | Hale | G06F 12/0238 |
| 2017/0075812 A1 * | 3/2017 | Wu | G06F 12/0246 |
| 2017/0206009 A1 * | 7/2017 | Kim | G06F 3/0655 |
| 2017/0262376 A1 * | 9/2017 | Hale | G06F 12/0238 |
| 2018/0107603 A1 * | 4/2018 | Hale | G06F 3/0673 |
| 2018/0329627 A1 * | 11/2018 | Kim | G06F 3/0655 |
| 2018/0373639 A1 * | 12/2018 | Hale | G06F 3/0604 |

OTHER PUBLICATIONS

Batni, et al., "A New Multi-Tiered Solid State Disk Using SLC/MLC Combined Flash Memory", International Journal of Computer Science, Engineering and Information Technology, Apr. 2014, 4(2), 13 pages.

* cited by examiner

BALANCING THE BLOCK WEARING LEVELING FOR OPTIMUM SSD ENDURANCE

BACKGROUND

Semiconductor memory devices or solid-state drives (SSD), including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even without power, as opposed to volatile memory, which requires power to maintain the stored information.

The semiconductor devices may be configured to include blocks or groups of single-level cell (SLC) non-volatile memory units and/or non-SLCs (nSLC) (e.g., multi-level, triple-level, quad-level, or any other non-single level cell) memory units. Each block may be between 256 KB and 4 MB. Similar type blocks (e.g., SLC or nSLC blocks) may be organized into groups or pools of blocks (also referred to herein as "block pools"), respectively. The semiconductor devices may be configured to conduct wear leveling on each of the blocks and/or block pools. Wear leveling is a technique to balance the use of flash memory blocks (measured in program erase cycles (PEC)) to increase longevity of the semiconductor memory devices. PEC may refer to the number of sequences where data is written to a portion of memory, then erased, and then rewritten. PEC may represent a quantification of endurance of the portion of memory because each PEC may cause a small amount of physical damage to the respective memory being accessed. After a certain number of PEC, the cells may begin to malfunction, making the data stored therein unreliable. The number of PECs available before the cells begin to malfunction is based on the type of cell. For example, an SLC is generally configured to endure more PECs than a nSLC. Traditional wear leveling treats the SLC blocks and nSLC blocks differently, so that SLC and nSLC blocks are "leveled" across their pool individually. All the blocks in the pool reach the maximum allowed PEC at about the same rate to achieve the targeted optimal SSD performance and endurance.

This is not efficient as there could be different host workloads targeting different block pools. Host workload may refer to a process implemented by the host system to perform one or more individualized tasks using the data in the block pools. These individualized tasks may include reading data from, or writing data to, the block pools, resulting in additional wear on these block pools. Therefore, situations may arise where the optimum SLC pool performance and endurance is reached by itself, while the nSLC pool has been barely used, or vice versa. Thus, as a whole, the SSD may not be optimized for wear leveling.

Thus, there is a need for an efficient semiconductor device and controller thereof that optimizes use of all blocks in the memory, not just individual block pools.

SUMMARY

Without limiting the scope of the appended claims, after considering this disclosure, and particularly after considering the section entitled "Detailed Description," one will understand how the aspects of various embodiments are implemented and used to perform wearing leveling with improved PEC leveling across all memory block types.

In one embodiment, there is a method for implementing balancing block wearing leveling at a storage device including one or more single level cell (SLC) blocks in a SLC block pool and one or more non-single level cell (nSLC) blocks in a nSLC block pool for storing data and a memory controller for performing operations on the SLC blocks and nSLC blocks, the method comprising: at the memory controller: receiving a first request to perform a wear leveling operation on a respective block pool of one of: the SLC block pool and the nSLC block pool; determining whether one or more blocks in the respective block pool meet block pool transfer criteria; in response to a determination that the one or more blocks in the respective block pool meets block pool transfer criteria, reclassifying the one or more blocks in the respective block pool as the other of the SLC block pool and the nSLC block pool; and in response to a determination that the one or more blocks in the respective block pool does not meet block pool transfer criteria, refraining from reclassifying the one or more blocks in the respective block pool as the other of the SLC block pool and the nSLC block pool.

In some embodiment, the respective block pool is the SLC block pool.

In some embodiments, the block pool transfer criteria includes a criterion that is met when a program erase cycle (PEC) count for one or more of the SLC blocks in the SLC block pool is less than a nSLC wear leveling threshold.

In some embodiments the nSLC wear leveling threshold is a predetermined maximum PEC count difference between an nSLC block with a highest PEC count in the nSLC block pool and an nSLC block with a lowest PEC count in the nSLC block pool.

In some embodiments the block pool transfer criteria includes a criterion that is met when a (PEC) count for the one or more SLC blocks is less than a sum of an average PEC count of the one or more nSLC blocks in the nSLC block pool and an nSLC wear leveling threshold.

In some embodiments the block pool transfer criteria includes a criterion that is met when a bit error rate (BER) of the one or more SLC blocks in the SLC block pool is less than a BER SLC threshold.

In some embodiments, in response to a determination that the one or more blocks in the respective block pool meets block pool transfer criteria, reclassifying one or more nSLC blocks in the nSLC block pool as one or more SLC blocks, wherein each of the one or more nSLC blocks have a program erase cycle count greater than a program erase cycle count of the other nSLC blocks in the nSLC block pool.

In some embodiments, the respective block pool is an nSLC block pool, wherein reclassifying one or more nSLC blocks in the nSLC block pool as one or more SLC blocks in the SLC block pool includes multiplying a corresponding PEC count for each of the one or more nSLC blocks by a SLC conversion factor.

In some embodiments, the respective block pool is the nSLC block pool and wherein the block pool transfer criteria includes a criterion that is met when a bit error rate (BER) of the one or more nSLC blocks in the nSLC block pool is less than a BER nSLC threshold.

BRIEF DESCRIPTION OF THE SEVERAL VIEWS OF THE DRAWINGS

The foregoing summary, as well as the following detailed description of embodiments of the disclosed invention, will be better understood when read in conjunction with the appended drawings of an exemplary embodiment. It should be understood, however, that the invention is not limited to the precise arrangements and instrumentalities shown.

In the drawings.

DETAILED DESCRIPTION

In some embodiments, flash memory block endurance on the SSD system with improved PEC leveling across all memory block types may be improved by dynamically converting the SLC blocks to non-SLC block, and vice versa based on certain criteria (e.g., PEC and/or wear leveling meeting certain criteria from both SLC and non-SLC pools), the flash memory block endurance on the SSD system may be balanced.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as to not unnecessarily obscure pertinent aspects of the embodiments described herein.

Figure 1:
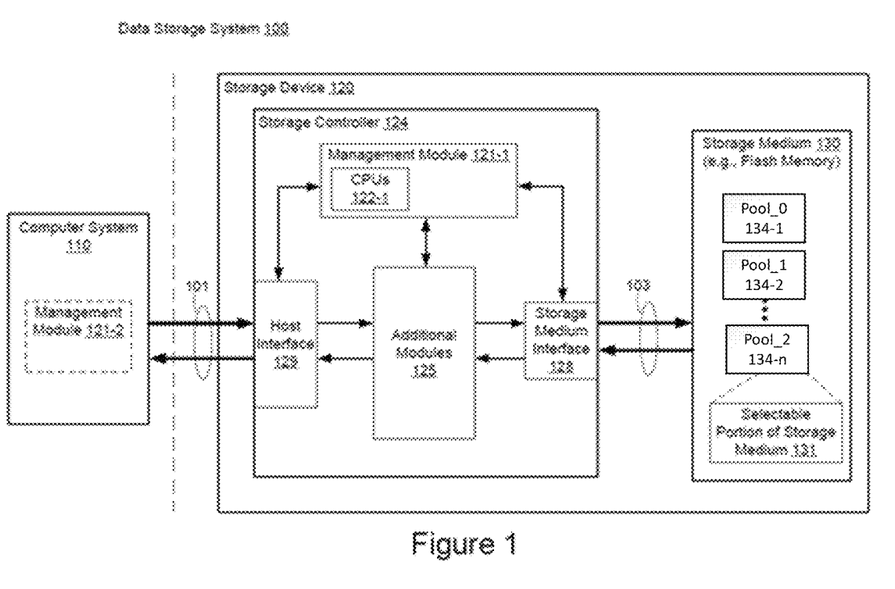
FIG. 1 is a block diagram illustrating an implementation of a data storage system, in accordance with some embodiments.

Referring to FIG. 1, there is shown a block diagram illustrating an implementation of a data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes a storage device 120 (also sometimes called an information storage device, or a data storage device, or a memory device), which includes a storage controller 124 and a storage medium 130, and is used in conjunction with or includes a computer system 110 (e.g., a host system or a host computer). In some embodiments, storage medium 130 is a single flash memory device while in other embodiments storage medium 130 includes a plurality of flash memory devices. In some embodiments, storage medium 130 is NAND-type flash memory or NOR-type flash memory. In some embodiments, storage medium 130 includes one or more three-dimensional (3D) memory devices. In some embodiments, the memory cells of storage medium 130 are configured to store two or three bits per memory cell. Further, in some embodiments, storage controller 124 is a solid-state drive (SSD) controller. However, other types of storage media may be included in accordance with aspects of a wide variety of embodiments (e.g., Phase Change Random-Access Memory (PCRAM), Resistive Random Access Memory (ReRAM), Spin-Transfer Torque Random-Access Memory (STT-RAM), Magnetoresistive Random-Access Memory (MRAM), etc.). In some embodiments, a flash memory device includes one or more flash memory die, one or more flash memory packages, one or more flash memory channels or the like. In some embodiments, data storage system 100 includes one or more storage devices 120.

Computer system 110 is coupled to storage controller 124 through data connections 101. However, in some embodiments computer system 110 includes storage controller 124, or a portion of storage controller 124, as a component and/or as a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110. In some embodiments, computer system 110 does not have a display and other user interface components.

Storage medium 130 is coupled to storage controller 124 through connections 103. Connections 103 are sometimes called data connections, but typically convey commands in addition to data, and optionally convey metadata, error correction information and/or other information in addition to data values to be stored in storage medium 130 and data values read from storage medium 130. In some embodiments, however, storage controller 124 and storage medium 130 are included in the same device (i.e., an integrated device) as components thereof. Furthermore, in some embodiments, storage controller 124 and storage medium 130 are embedded in a host device (e.g., computer system 110), such as a mobile device, tablet, other computer or computer controlled device, and the methods described herein are performed, at least in part, by the embedded storage controller. Storage medium 130 may include any number (i.e., one or more) of memory devices 134-$i$ including, without limitation, persistent memory or non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives. Additionally, and/or alternatively, flash memory device(s) can also be configured for relatively smaller-scale applications such as personal flash drives or hard-disk replacements for personal, laptop, and tablet computers. In some embodiments, each memory device 134-$i$ is a single 3D persistent memory or non-volatile semiconductor memory die, that includes multiple erase blocks (e.g., arrays 302, FIG. 3, sometimes simply called "blocks"), which are the minimum size erasable units in those memory devices. In some embodiments, the computer system 110 and/or storage controller 124 may allocate erase blocks in a respective memory device 134-i into groups of one or more block pools. For example, in some such embodiments, each block pool of the respective memory device 134-i includes N blocks, where N is an integer greater than 1, and typically is greater than 15, 63, or 99.

Memory devices 134-i of storage medium 130 may include addressable and individually selectable blocks, such as selectable portion 131 of storage medium 130 (also referred to herein as selected portion 131). In some embodiments, the individually selectable blocks (sometimes called erase blocks) are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for writing data to or reading data from the flash memory device.

In some embodiments, storage controller 124 includes a management module 121-1, a host interface 129, a storage medium interface 128, and additional module(s) 125. Storage controller 124 may include various additional features that have not been illustrated for the sake of brevity and so as not to obscure pertinent features of the example embodiments disclosed herein, and a different arrangement of features may be possible. Host interface 129 provides an interface to computer system 110 through data connections 101. Host interface 129 typically includes an input buffer and output buffer, not shown. Similarly, storage medium Interface 128 provides an interface to storage medium 130 though connections 103. In some embodiments, storage medium Interface 128 includes read and write circuitry, including circuitry capable of providing reading signals to storage medium 130 (e.g., reading threshold voltages for NAND-type flash memory).

In some embodiments, management module 121-1 includes one or more processing units 122-1 (sometimes herein called CPUs, processors, or hardware processors, and sometimes implemented using microprocessors, microcontrollers, or the like) configured to execute instructions in one or more programs (e.g., in management module 121-1). In some embodiments, the one or more CPUs 122-1 are shared by one or more components within, and in some cases, beyond the function of storage controller 124. Management module 121-1 is coupled to host interface 129, additional module(s) 125 and storage medium Interface 128 in order to coordinate the operation of these components. In some embodiments, one or more modules of management module 121-1 are implemented in management module 121-2 of computer system 110. In some embodiments, one or more processors of computer system 110 (not shown) are configured to execute instructions in one or more programs (e.g., in management module 121-2). Management module 121-2 is coupled to storage device 120 in order to manage the operation of storage device 120.

In some embodiments, additional module(s) 125 include an error control module, provided to limit the number of uncorrectable errors inadvertently introduced into data during writes to memory or reads from memory. In some embodiments, the error control module is executed in software by the one or more CPUs 122-1 of management module 121-1, and, in other embodiments, the error control module is implemented in whole or in part using special purpose circuitry to perform data encoding and decoding functions. To that end, in some embodiments, the error control module includes an encoder and a decoder. The encoder encodes data by applying an error control code to produce a codeword, which is subsequently stored in storage medium 130.

When the encoded data (e.g., one or more codewords) is read from storage medium 130, the decoder applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

The storage controller 124 is configured to perform sensing operations (e.g., read operations or also referred to herein as wear leveling operation). A read operation is initiated when computer system (host) 110 sends one or more host read commands (e.g., via data connections 101) to storage controller 124 requesting data from one or more block pools of storage medium 130. Storage controller 124 sends one or more read access commands to storage medium 130, via storage medium interface 128, to obtain raw read data in accordance with memory locations (addresses at specific pools) specified by the one or more host read commands. Storage medium interface 128 provides the raw read data (e.g., comprising one or more codewords) to the decoder. If the decoding is successful, the decoded data is provided to an output buffer, where the decoded data is made available to computer system 110. In some embodiments, if the decoding is not successful, storage controller 120 may resort to a number of remedial actions or provide an indication of an irresolvable error condition.

Figure 2:
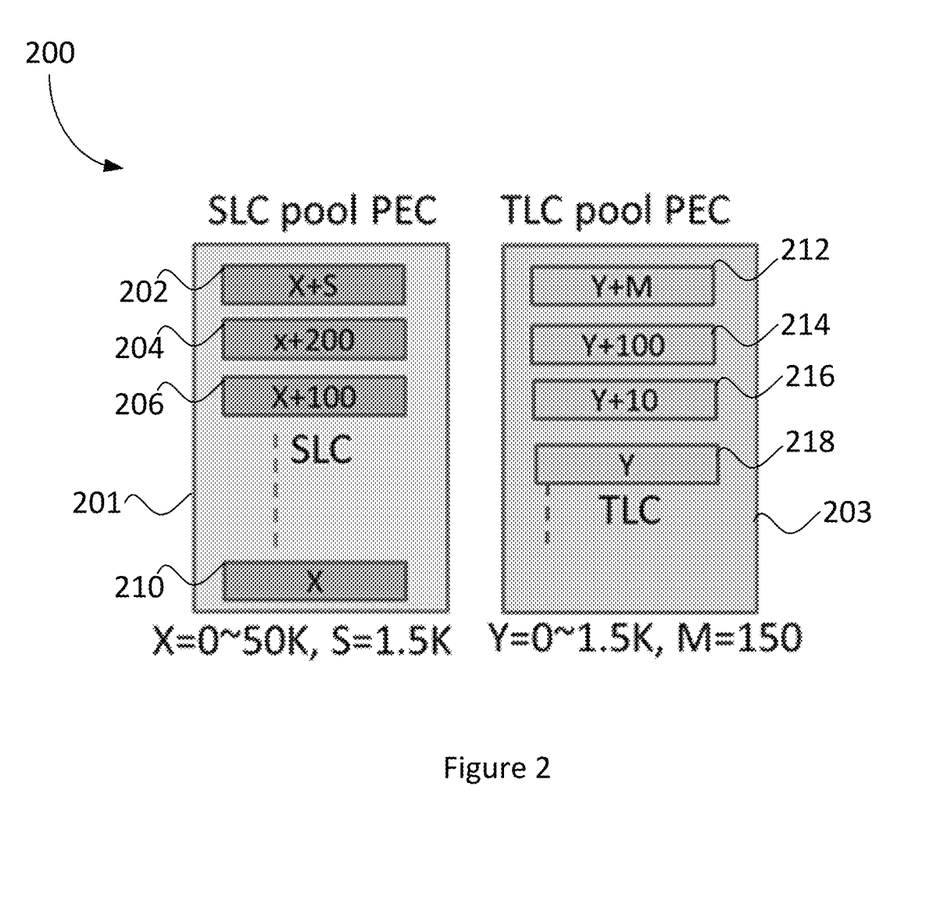
FIG. 2 is a block diagram illustrating block pools with different memory types (e.g., SLC or nSLC), in accordance with an exemplary embodiment of the present invention.

Referring to FIG. 2, there is shown a block diagram 200, illustrating an SLC block pool 208 and nSLC block pool 220 allocated by storage controller 124 (or alternatively computer system 110) in memory 134-i of FIG. 1, in accordance with some embodiments. While some example features are illustrated, various other features have not been illustrated for the sake of brevity and so as not to obscure pertinent aspects of the example embodiments disclosed herein. SLC and nSLC pools may consist of individual blocks. As referred to herein, a block may be a group of cells of a similar type (e.g., SLC or nSLC) allocated by a host system 110 and/or a storage controller 124. As referred to herein, a pool may be a group of blocks allocated by computer system 110 and/or storage controller 124. Data describing the SLC and nSLC blocks and/or block pools may be stored in storage medium 130. For example, as shown in FIG. 2, SLC pool may include blocks 202-206, 210, among others shown in FIGS. 3-4 and explained in more detail below. nSLC pool (shown as TLC pool in FIG. 2) may include blocks 212-218, among others shown in FIGS. 3-4 and explained in more detail below. Each block 202-206, 210-218 in a pool 208, 220 may have a unique PEC value (e.g., X for block 210, or Y+100 for block 214) representing the number of program-erase cycles that have already been performed on the respective block. One or more PEC values may be stored in storage medium 130. For ease of explanation and reference, the blocks are shown as sorted vertically from highest to lowest value.

A minimum PEC value for a block in an SLC pool may be represented as "X" in the Figures. The minimum PEC value for a block in an SLC pool may be selected by an operator or calculated using other various techniques used to calculate minimum PEC values. In this exemplary embodiment, the minimum PEC value in the SLC pool may be a value between zero (0) and fifty thousand (50,000). Data describing the minimum PEC value for a block in an SLC pool may be stored in storage medium 130.

A maximum difference between PEC values in the SLC pool (also referred to herein as "SLC PEC spread") may be represented as "S" in the Figures. In the exemplary embodiment of FIG. 2, S is one-thousand five hundred (1,500). The maximum difference between PEC values in the SLC pool may be selected by an operator or calculated using other various techniques used to calculate maximum difference between PEC values in the SLC pool. Data describing the maximum difference between PEC values in the SLC pool may be stored in storage medium 130.

A minimum PEC value for a block in an nSLC pool may be represented as "Y" in Figures. In this exemplary embodiments, the minimum PEC value in the nSLC pool may be a value between zero (0) and one-thousand five hundred (1,500). A minimum PEC value for a block in an nSLC pool may be selected by an operator or calculated using other various techniques used to calculate minimum PEC value for a block in an nSLC pool. Data describing the minimum PEC value for a block in an nSLC pool may be stored in storage medium 130.

A maximum difference between PEC values in the nSLC pool (also referred to herein as "nSLC PEC spread") may be represented as "M" in the Figures. In the exemplary embodiment of FIG. 2, M is one hundred and fifty (150). The maximum difference between PEC values in the nSLC pool may be selected by an operator or calculated using other various techniques used to calculate maximum difference between PEC values. Data describing the maximum difference between PEC values in the nSLC pool may be stored in storage medium 130.

Figure 3:
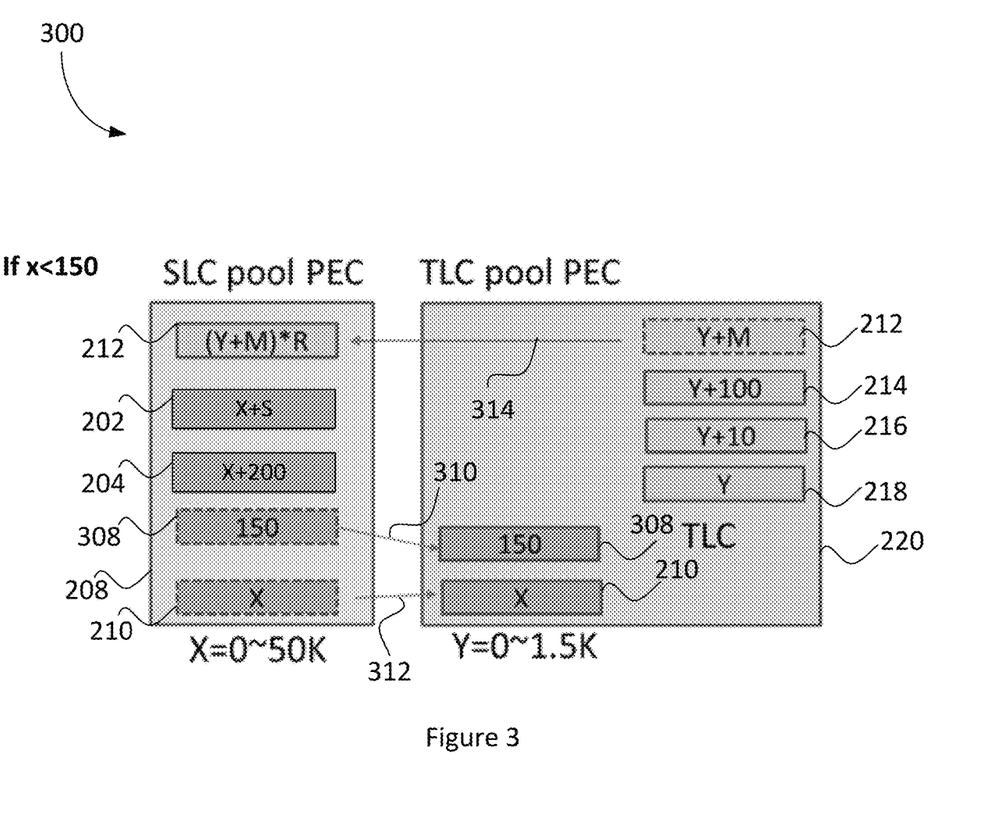
FIG. 3 is a block diagram illustrating balancing block wearing leveling across the block pools with different memory types (e.g., SLC or nSLC), in accordance with an exemplary embodiment of the present invention.

Referring to FIG. 3, there is shown a block diagram 300, illustrating balancing block wear leveling across pools of FIG. 2, in accordance with some embodiments. While some example features are illustrated, various other features have not been illustrated for the sake of brevity and so as not to obscure pertinent aspects of the example embodiments disclosed herein. In some embodiments either the storage controller 124 or the computer system 110 may perform the functions described herein. For ease of explanation, in the examples described herein, storage controller 124 of FIG. 1 has received a request or generated an instruction to perform a wear leveling operation on SLC pool 208.

After a request to perform a wear leveling operation on SLC pool 208 is received at the storage controller 124, the storage controller 124 may determine whether one or more blocks in SLC pool 208 meets pool transfer criteria. For example, as shown in FIG. 3, pool transfer criteria for SLC pool 208 may include a criterion that is met when a PEC value of one or more SLC blocks is less than or equal to the nSLC PEC spread. As shown in FIG. 3, the storage controller 124 determines that block 308 and block 210 met the pool transfer criteria because each block is less than or equal to the nSLC PEC spread of 150. In FIG. 3, the nSLC PEC spread is 150, and both blocks 308 and 210 have a value of 150 or "X", which when shown as vertically sorted from highest to lowest as in FIG. 3, is a value less than 150.

In response to determining that block 308 and block 210 meets the pool transfer criteria, the storage controller 124 reclassifies (or "transfers") block 308 and block 210 as nSLC blocks in the nSLC pool. Arrows 310 and 312 represent block 308 and block 210, respectively, being transferred from the SLC pool 208 to the nSLC pool 220. Blocks 308 and blocks 210 may now be utilized as nSLC blocks for data storage. By performing the transfer, lesser utilized blocks that have been reclassified to the nSLC pool can lower the overall average PEC count of all of the blocks in the nSLC pool thereby improving longevity and performance of the semiconductor device. As used herein, reclassified may mean the transferring or reallocating of individual blocks from an SLC pool to a nSLC pool or vice versa, by the storage controller 124, such that these transferred or reallocated blocks may be utilized similar to other blocks in the respective block pool. For example, blocks 308 and 210, which were originally utilized as SLC blocks may now be utilized as nSLC blocks. The information regarding the reallocation may be stored in storage medium 130.

In some embodiments, in response to determining that block 308 and block 210 meets the pool transfer criteria, the storage controller 124 reclassifies one or more nSLC blocks to the SLC pool. These one or more nSLC blocks usually have the highest PEC count in the nSLC pool. For example, in FIG. 3, block 212 has the highest PEC value of "Y+M". Accordingly, block 212 is reclassified from the nSLC pool to the SLC pool. Arrow 314 represent block 212 being transferred from the SLC pool 208 to the nSLC pool 220.

In some embodiments, the PEC value of a block converted from an nSLC pool to an SLC pool is multiplied by a factor R, where R is any positive integer value. This conversion is performed to properly allocate a previously nSLC block into the SLC blocks and assign proper wear leveling, since SLC blocks are used more frequently than nSLC blocks. Factor R may be based on a relationship between a level type of the blocks in the nSLC pool and the single level type of the blocks in the SLC pool. For example, if the nSLC pool is a quad-level cell pool, then Factor R may be a value of 4, which corresponds to the ratio of the level type of the nSLC block (i.e., 4) and the level type of the SLC block (i.e., 1). In other embodiments, if the nSLC pool is a multi-level cell, R may be a value of 2 and if the nSLC pool is a triple-level cell, R may be a value of 3.

In some embodiments, the pool transfer criteria may include a further criterion that is met when a BER of the one or more SLC blocks in SLC block pool 208 is less than a BER SLC threshold (e.g., about 0.01%). In accordance with a determination that the one or more SLC blocks (e.g., SLC block 210) in SLC pool 208 is less than or equal to the nSLC PEC spread and the BER of the one or more SLC blocks is less than the BER SLC threshold, SLC block 210 may be reclassified as an nSLC block as explained above. By conditioning reclassification based on BER, there can be confirmation that usage of a previously SLC block as a new nSLC block will not create increased BER issues when the new nSLC block is used.

In some embodiments, the pool transfer criteria may include a criterion that is met when one or more nSLC blocks of the nSLC block pool 220 have a BER less than a BER nSLC threshold (e.g., about 0.02%). When converting from nSLC to SLC, the resulting SLC may be fully functional SLC just as any intrinsic SLC block, instead of being limited to a subset of states (e.g., 3 of 4 or 7 of 8). By checking the bit error rate to confirm the usage of a previously nSLC block as a new SLC block, increased BER issues can be avoided.

Figure 4:
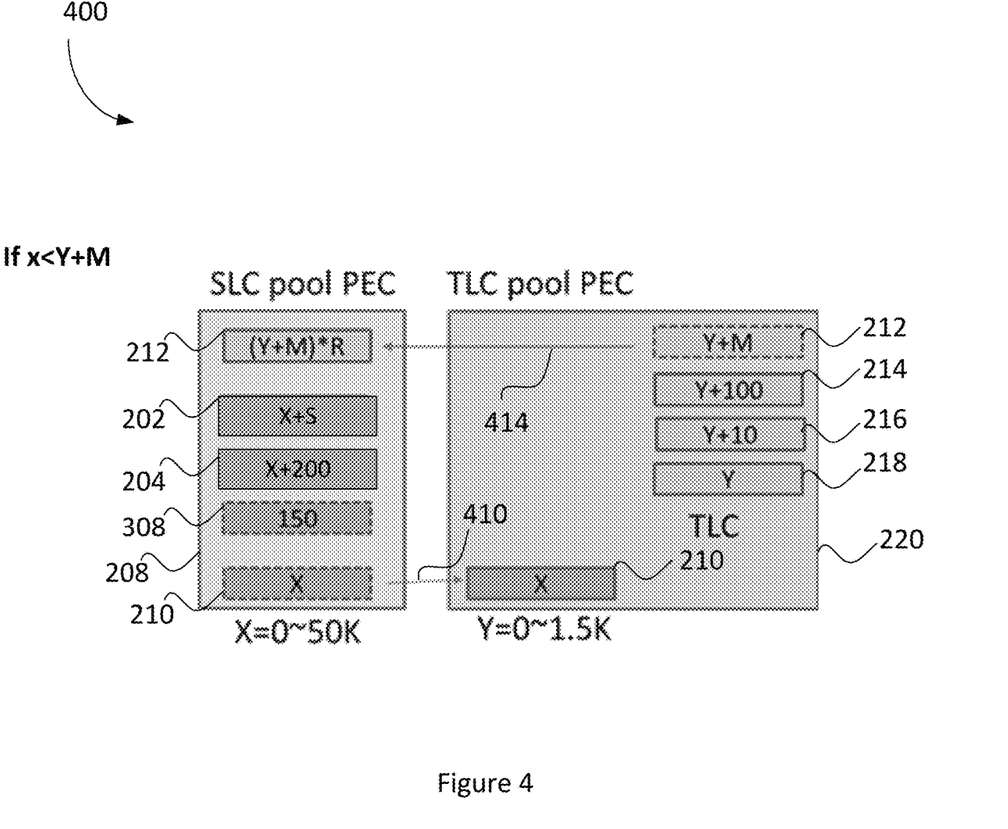
FIG. 4 is a block diagram illustrating balancing block wearing leveling across block pools with different memory types (e.g., SLC or nSLC), in accordance with an exemplary embodiment of the present invention.

Referring to FIG. 4, there is shown a block diagram 400, illustrating balancing block wearing leveling across pools of FIG. 2, in accordance with some embodiments. While some example features are illustrated, various other features have not been illustrated for the sake of brevity and so as not to obscure pertinent aspects of the example embodiments disclosed herein. In this example, storage controller 124 of FIG. 1 has received a request to perform a wear leveling operation on SLC pool 208.

After a request (or alternatively an instruction) to perform a wear leveling operation on SLC pool 208 is received at the storage controller 124, the storage controller 124 may determine whether one or more blocks in SLC pool 208 meet pool transfer criteria. For example, as shown in FIG. 4, pool transfer criteria for SLC pool 208 may include a criterion that is met when a PEC value of one or more SLC blocks is less than the sum of the average PEC value for nSLC pool 220 and the nSLC PEC spread. In FIG. 4, the PEC value for nSLC pool 220 is "Y" and the nSLC PEC spread is "M". Therefore, the criterion is met for SLC block 210, where "x" is less than the sum of the PEC value for nSLC pool 220 "Y" and the nSLC PEC spread "M". In this example, Y may be zero (0) and M may be one-hundred fifty (150). Block 210, designated as "X" is less than 150 because the SLC blocks are sorted vertically from highest to lowest values. As shown in FIG. 4, the storage controller 124 determines that block 210 has a value of less than 150.

In response to determining that block 210 meets the pool transfer criteria, the storage controller 124 may reclassify (or "transfer") block 210 as an nSLC block in the nSLC pool. Arrow 410 represents block 210 being transferred from the SLC pool 208 to the nSLC pool 220. Block 210 may now be utilized as nSLC blocks for data storage. By performing the transfer, lesser utilized blocks that have been reclassified to the nSLC pool can lower the overall average PEC count of all of the blocks in the nSLC pool thereby improving longevity and performance of the semiconductor device.

In some embodiments, in response to determining that block 210 meets the pool transfer criteria, the storage controller 124 may reclassify one or more nSLC blocks to the SLC pool. These one or more nSLC blocks usually have the highest PEC count in the nSLC pool. For example, in FIG. 4, block 212 has the highest PEC value of "Y+M". Accordingly, block 212 is reclassified from the nSLC pool to the SLC pool. Arrow 414 represents block 212 being transferred from the SLC pool 208 to the nSLC pool 220.

In this embodiment, as explained herein, the PEC value of a block converted from an nSLC pool to an SLC pool is multiplied by a factor R.

In some embodiments, the pool transfer criteria may include a further criterion that is met when a BER of the one or more SLC blocks in SLC block pool 208 is less than a BER SLC threshold (e.g., about 0.01%). In accordance with a determination that the one or more SLC blocks in SLC pool 208 is less than or equal to the nSLC PEC spread and the BER of the one or more SLC blocks is less than the BER SLC threshold, the one or more SLC blocks may be reclassified as nSLC blocks as explained above. In one embodiment, by conditioning reclassification based on BER, there can be confirmation that usage of a previously SLC block as a new nSLC block will not create increased BER issues.

Figure 5:
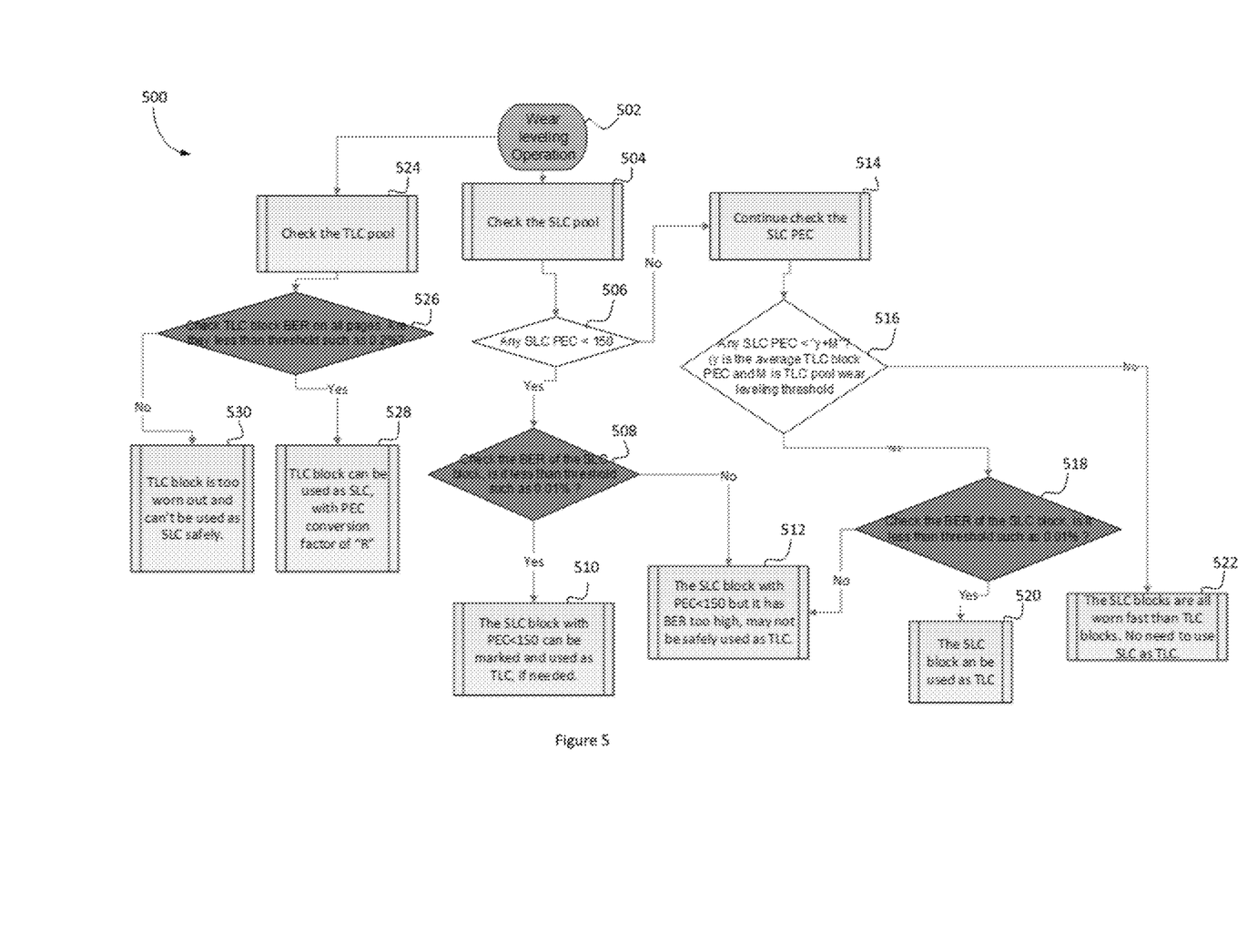
FIG. 5 is a flow chart illustrating balancing block wearing leveling, in accordance with an exemplary embodiment of the present invention.

Referring now to FIG. 5 there is shown a flow chart 500, illustrating a balancing block wearing leveling operation, in accordance with some embodiments. While some example features are illustrated, various other features have not been illustrated for the sake of brevity and so as not to obscure pertinent aspects of the example embodiments disclosed herein.

At step 502, storage controller 124 receives a request to perform a wear leveling operation on respective block pool of one of: the first level-type block pool and the second level-type block pool. In some embodiments, a first level-type block pool includes an SLC pool 208. In some embodiments, a second level-type block pool includes an nSLC pool 220.

At step 504, storage controller 124 may check one or more SLC pools (e.g., SLC pool 208). The check may include making a determination about whether to transfer or reclassify one or more SLC blocks as nSLC blocks, as described in the following steps.

At step 506, storage controller 124 may determine whether one or more blocks in SLC pool 208 meet pool transfer criteria. In some embodiments, the block pool transfer criteria includes a criterion that is met when a program erase cycle (PEC) count for one or more of the SLC blocks in the SLC block pool is less than a nSLC wear leveling threshold. In some embodiments, the nSLC wear leveling threshold is a predetermined maximum PEC count difference between an nSLC block with a highest PEC count in the nSLC block pool and an nSLC block with a lowest PEC count in the nSLC block pool. For example, in FIG. 3, the nSLC wear leveling threshold (also referred to herein as "nSLC PEC spread") of M is one hundred and fifty (150). As explained above, blocks 308 and 210 may have a value of less than 150, meaning that the blocks 308, 210 meet the pool transfer criteria.

At step 508, if the storage controller 124 determines that one or more blocks (e.g., block 308 and block 210) in SLC pool 208 meets a pool transfer criterion of step 506, the storage controller 124 may determine whether one or more blocks in SLC pool 208 meets further pool transfer criteria. In this embodiment, the pool transfer criteria includes a further criterion that is met when a BER of the one or more SLC blocks in SLC block pool 208 is less than a BER SLC threshold (e.g., about 0.01%).

At step 510, if the storage controller 124 determines that one or more blocks (e.g., block 308 and block 210) in SLC pool 208 meets the pool transfer criteria of 506 and 508, the storage controller 124 may reclassify (or "transfer") the one or more SLC blocks as nSLC blocks in the nSLC pool. For example, in FIG. 3, arrows 310 and 312 represent block 308 and block 210, respectively, being transferred from the SLC pool 208 to the nSLC pool 220 because these blocks met the pool transfer criteria. Block 308 and block 210 may now be utilized as nSLC blocks for data storage.

At step 512, if the storage controller 124 determines that one or more blocks (e.g., block 308 and block 210) in SLC pool 208 does not meet the pool transfer criteria of 506 or 508, the storage controller 124 may refrain from reclassifying (or "transferring") the one or more SLC blocks as nSLC blocks in the nSLC pool because the BER for the SLC blocks may be too high and many not be safely used as nSLC blocks.

As a continuation from step 506, at step 514, storage controller 124 may continue to check one or more SLC pools (e.g., SLC pool 208).

At step 516, storage controller 124 may determine whether one or more blocks in SLC pool 208 meets pool transfer criteria. In some embodiments, the pool transfer criteria may include a criterion that is met when be a PEC value of one or more SLC blocks is less than the sum of the average PEC value for nSLC pool 220 and the nSLC PEC spread. For example, in FIG. 4, nSLC pool PEC value Y may be zero (0) and nSLC PEC spread M may be one-hundred fifty (150). Block 210, designated as "X" is less than 150 because the SLC blocks are sorted vertically from highest to lowest values. As shown in FIG. 4, the storage controller 124 determines that block 210 has a value of less than 150.

At step 518, if the storage controller 124 determines that one or more blocks (e.g., block 210) in SLC pool 208 meets a pool transfer criterion of step 516, the storage controller 124 may determine whether one or more blocks in SLC pool 208 meets further pool transfer criteria. In this embodiment, the pool transfer criteria includes a further criterion that is met when a BER of the one or more SLC blocks in SLC block pool 208 is less than a BER SLC threshold (e.g., about 0.01%).

If the storage controller 124 determines that the one or more blocks in SLC pool 208 does not meet pool transfer criteria of steps 516 or 518, the method 500 may proceed to step 512.

At step 520, if the storage controller 124 determines that one or more blocks (e.g., block block 210) in SLC pool 208 meets the pool transfer criteria of 516 and 518, the storage controller 124 may reclassify (or "transfer") the one or more SLC blocks as nSLC blocks in the nSLC pool. For example, in FIG. 4, arrow 410 represent block 210, being transferred from the SLC pool 208 to the nSLC pool 220. Block 210 may now be utilized as nSLC blocks for data storage.

At step 522, if the storage controller 124 determines that one or more blocks (e.g., block 210) in SLC pool 208 does not meet pool transfer criterion of step 516, the storage controller 124 may refrain from reclassifying (or "transferring") the one or more SLC blocks as nSLC blocks in the nSLC pool because the SLC blocks have likely worn faster than the nSLC blocks.

As a continuation from step 506, at step 524, storage controller 124 may check one or more nSLC pools (e.g., nSLC pool 220). The check may include making a determination about whether to transfer or reclassify one or more nSLC blocks as SLC blocks, as described in the following steps.

At step 526, storage controller 124 may determine whether one or more blocks in nSLC pool 220 meets pool transfer criteria. In some embodiments, the pool transfer criteria may include a criterion that is met when one or more nSLC blocks of the nSLC block pool 220 have a BER less than a BER nSLC threshold (e.g., about 0.02%).

At step 528, if the storage controller 124 determines that one or more blocks in nSLC pool 220 meets pool transfer criteria, the storage controller 124 may reclassify (or "transfer") the one or more nSLC blocks as SLC blocks in the SLC pool. In some embodiments, as explained herein, the PEC value of a block converted from an nSLC pool to an SLC pool is multiplied by a factor R.

At step 530, if the storage controller 124 determines that one or more blocks (e.g., block 210) in nSLC pool 220 does not meet pool transfer criterion of step 516, the storage controller 124 may refrain from reclassifying (or "transferring") the one or more nSLC blocks as SLC blocks in the SLC pool because the nSLC blocks have likely worn faster than the SLC blocks.

In at least one embodiment, there is included one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention, different components as opposed to those specifically mentioned may perform at least some of the features described herein, and features of the disclosed embodiments may be combined. As used herein, the terms "about" and "approximately" may refer to + or −10% of the value referenced. For example, "about 9" is understood to encompass 8.2 and 9.9.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

It will be understood that, although the terms "first," "second," etc. are sometimes used herein to describe various elements, these elements should not be limited by these terms. These terms are only used to distinguish one element from another. For example, a first element could be termed a second element, and, similarly, a second element could be termed a first element, without changing the meaning of the description, so long as all occurrences of the "first element" are renamed consistently and all occurrences of the second element are renamed consistently. The first element and the second element are both elements, but they are not the same element.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

We claim:

1. A method for implementing balancing block wear leveling at a storage device including one or more first level-type blocks in a first level-type block pool and one or more second level-type blocks in a second level-type block pool for storing data, the method comprising:
receiving a first request or first instruction to perform a wear leveling operation on a respective block pool of one of: the first level-type block pool and the second level-type block pool;
in response to receiving the first request or first instruction to perform a wear leveling operation:
determining whether one or more blocks in the respective block pool meet block pool transfer criteria,
in response to a determination that the one or more blocks in the respective block pool meets block pool transfer criteria, reclassifying the one or more blocks in the respective block pool as the other of the first level-type block pool and the second level-type block pool, and
in response to a determination that the one or more blocks in the respective block pool does not meet block pool transfer criteria, refraining from reclassifying the one or more blocks in the respective block pool as the other of the first level-type block pool and the second level-type block pool;
wherein the respective block pool is the first level-type block pool; and
wherein the block pool transfer criteria is met when a program erase cycle (PEC) count for the one or more first level-type blocks is less than a sum of an average PEC count of the one or more second level-type blocks in the second level-type block pool and a second level-type block wear leveling threshold.

2. The method of claim 1, wherein the block pool transfer criteria includes a criterion that is met when the PEC count for one or more of the first level-type blocks in the first level-type block pool is less than a second level-type wear leveling threshold.

3. The method of claim 2, wherein the second level-type wear leveling threshold is a predetermined maximum PEC count difference between a second level-type block with a highest PEC count in the second level-type block pool and an second level-type block with a lowest PEC count in the second level-type block pool.

4. The method of claim 1, further comprising: in response to a determination that the one or more blocks in the respective block pool meets block pool transfer criteria, reclassifying one or more second level-type blocks in the second level-type block pool as one or more first level-type blocks, wherein each of the one or more second level-type blocks have a program erase cycle count greater than a program erase cycle count of the other second level-type blocks in the second level-type block pool.

5. The method of claim 1, further comprising:
reclassifying one or more second level-type blocks in the second level-type block pool as one or more first level-type blocks in the first level-type block pool including multiplying a corresponding PEC count for each of the one or more second level-type blocks by a first level-type conversion factor.

6. A storage device including one or more first level blocks in a first level block pool and one or more second level blocks in a second level block pool for storing data, the storage device comprising:
means for receiving a first request or first instruction to perform a wear leveling operation on a respective block pool of one of: the first level block pool and the second level block pool;
in response to receiving the first request or first instruction to perform a wear leveling operation:
means for determining whether one or more blocks in the respective block pool meet block pool transfer criteria,
in response to a determination that the one or more blocks in the respective block pool meets block pool transfer criteria, means for reclassifying the one or more blocks in the respective block pool as the other of the first level block pool and the second level block pool, and
in response to a determination that the one or more blocks in the respective block pool does not meet block pool transfer criteria, means for refraining from reclassifying the one or more blocks in the respective block pool as the other of the first level block pool and the second level block pool;
wherein the respective block pool is the first level block pool; and
wherein the block pool transfer criteria is met when a program erase cycle (PEC) count for the one or more first level blocks is less than a sum of an average PEC count of the one or more second level blocks in the second level block pool and a second level wear leveling threshold.

7. The storage device of claim 6, wherein the block pool transfer criteria include a criterion that is met when the PEC count for one or more of the first level blocks in the first level block pool is less than a second level block wear leveling threshold.

8. The storage device of claim 7, wherein the second level block wear leveling threshold is a predetermined maximum PEC count difference between a second level-type block with a highest PEC count in the second level block pool and an second level block with a lowest PEC count in the second level block pool.

9. The storage device of claim 6, the storage device including in response to a determination that the one or more blocks in the respective block pool meets block pool transfer criteria, means for reclassifying one or more second level blocks in the second level block pool as one or more first level blocks, wherein each of the one or more second level blocks have a program erase cycle count greater than a program erase cycle count of the other second level-type blocks in the second level block pool.

10. The storage device of claim 6, the storage device including:
means for reclassifying one or more second level blocks in the second level block pool as one or more first level blocks in the first level block pool including multiplying a corresponding PEC count for each of the one or more second level blocks by a first level conversion factor.

11. A memory controller for performing operations on single level cell (SLC) blocks and non-single level cell (non-SLC) blocks, the memory controller configured to perform the operations of:
receiving a first request or first instruction to perform a wear leveling operation on a respective SLC block pool;
in response to receiving the first request or first instruction to perform a wear leveling operation:
determining whether one or more SLC blocks in the respective SLC block pool meet block pool transfer criteria,
in response to a determination that the one or more SLC blocks in the respective SLC block pool meets the block pool transfer criteria, reclassifying the one or more SLC blocks in the respective SLC block pool to a non-SLC block pool, and
in response to a determination that the one or more SLC blocks in the respective SLC block pool does not meet the block pool transfer criteria, refraining from reclassifying the one or more SLC blocks in the respective SLC block pool to the non-SLC block pool; and
wherein the block pool transfer criteria is met when a program erase cycle (PEC) count for the one or more SLC blocks is less than a sum of an average PEC count of the one or more non-SLC blocks in the non-SLC block pool and a non-SLC block wear leveling threshold.

12. The memory controller of claim 11, wherein the block pool transfer criteria include a criterion that is met when the PEC count for one or more of the SLC blocks in the SLC block pool is less than a non-SLC block wear leveling threshold.

13. The memory controller of claim 12, wherein the non-SLC block wear leveling threshold is a predetermined maximum PEC count difference between a non-SLC block with a highest PEC count in the non-SLC block pool and a non-SLC block with a lowest PEC count in the non-SLC block pool.

14. The memory controller of claim 11, the memory controller configured to perform the operations of:
reclassifying one or more non-SLC blocks in the non-SLC block pool as one or more SLC blocks in the SLC block pool including multiplying a corresponding PEC count for each of the one or more non-SLC blocks by a first level conversion factor.

\* \* \* \* \*